(12) United States Patent
Yajima et al.

(10) Patent No.: US 6,862,104 B2
(45) Date of Patent: *Mar. 1, 2005

(54) INFORMATION TRANSMITTING APPARATUS

(75) Inventors: Shunsuke Yajima, Nara (JP); Tatsuo Nomura, Souraku-gun (JP); Kouki Fukuda, Nara (JP); Syoichiro Yoshiura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 898 days.

This patent is subject to a terminal disclaimer.

(21) Appl. No.: 09/808,324

(22) Filed: Mar. 14, 2001

(65) Prior Publication Data

US 2001/0022665 A1 Sep. 20, 2001

(30) Foreign Application Priority Data

Mar. 14, 2000 (JP) .................................... 2000-070801

(51) Int. Cl.[7] .............................................. G06H 15/00
(52) U.S. Cl. ...................................... 358/1.15; 358/1.6
(58) Field of Search ..................... 358/1.1, 1.6, 1.4, 358/1.13, 1.15, 1.14; 710/8, 72

(56) References Cited

U.S. PATENT DOCUMENTS

| 5,513,126 | A | | 4/1996 | Harkins et al. | ......... | 364/514 A |
| 5,726,883 | A | * | 3/1998 | Levine et al. | ................. | 700/83 |
| 5,740,336 | A | | 4/1998 | Wakisaka et al. | ........... | 395/113 |
| 5,881,233 | A | | 3/1999 | Toyoda et al. | ......... | 395/200.48 |
| 6,535,295 | B1 | * | 3/2003 | Brossman et al. | ......... | 358/1.15 |

FOREIGN PATENT DOCUMENTS

| EP | 0 679 014 A2 | 10/1995 | |
| EP | 0 902 582 A2 | 3/1999 | |
| JP | 01-274541 | 11/1989 | |
| JP | 05-183663 | 7/1993 | |
| JP | 06-178011 | 6/1994 | |
| JP | 08-24 2326 | 9/1996 | ............ H04N/1/00 |
| JP | 09-098271 | 4/1997 | |
| JP | 09-247334 | 9/1997 | ............ H04N/1/00 |
| JP | 10-065898 | 3/1998 | |
| JP | 11-133813 | 5/1999 | |

OTHER PUBLICATIONS

European Search Report for Application No. 01105174.5–1241 dated Dec. 17, 2002 (3pp).
Japen Patent Office First Office Action (2 pp.) for application No. 2000–070801 and English Translation (2 pp).

* cited by examiner

Primary Examiner—Arthur G. Evans
(74) Attorney, Agent, or Firm—Edwards & Angell, LLP; David G. Conlin; George W. Hartnell, III

(57) ABSTRACT

An information transmitting apparatus includes: a job status management unit (e.g., a controller made up of a micro computer and other components) for managing the job statuses of transmitting information of the first and second information transmitting devices (e.g., a facsimile unit and e-mail facsimile unit); a display unit (display portion) for displaying the transmission status of jobs in each information transmitting device managed by the job status management unit; and a display controller (e.g., a controller made up of a micro computer and other components) for determining, based on the destination designated by a destination designating device (operation control portion), which transmission status of jobs of the first or second information transmitting device should be displayed on the display unit.

10 Claims, 9 Drawing Sheets

FIG. 8

CUSTOMER DESTINATION INDEX TABLE

| MANAGEMENT NO. | FINGERTIP KEY NAME | DESTINATION 1 | DESTINATION 2 | DESTINATION 3 |
|---|---|---|---|---|
| 01 | A | 03XXXXXXXX | 045XXXXXXX | 06XXXXXXXX |
| 02 | B | 06XXXXXXXX | | |
| 03 | C | 0743XXXXXX | abc@xyz.co.jp | |
| 04 | D | email@ssaap.co.jp | | |
| 05 | E | 06XXXXXXXX | 03XXXXXXXX | XXX@22pm.co.uk |
| 06 | F | 001@aaa.co.jp | email@bbb.com | |

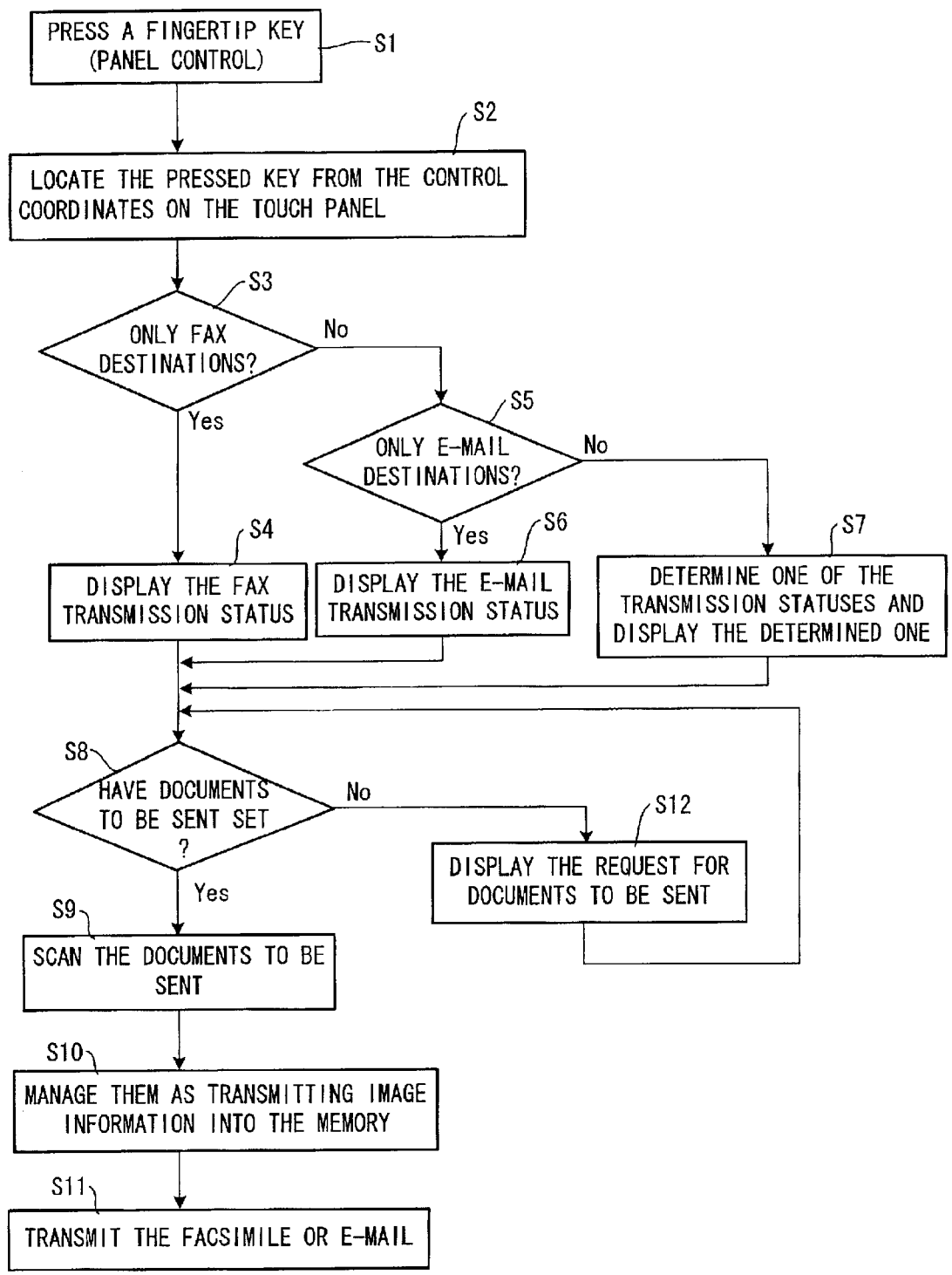

INFORMATION TRANSMITTING APPARATUS

BACKGROUND OF THE INVENTION (1) Field of the Invention

The present invention relates to an information transmitting apparatus capable of performing data transmission by way of multiple data transmission paths, and more particularly relates to an information transmitting apparatus having the usual facsimile transmission function and the e-mail facsimile transmission function for transmitting and receiving graphic/original images via the internet.

(2) Description of the Prior Art

Recently, facsimile machines which permit transmission and reception of images by a simple operation are widely used in a good many enterprises. However, the facsimile machines have problems in that it is impossible to confirm whether the transmitted documents have been received by the specified addressee and anybody can read the received facsimiles. Further, when faxing overseas or to other places where the connection is bad, it is necessary to repeatedly send the documents many times.

On the other hand, with the current rapid spread and development of the internet or the worldwide network, the number of people, mainly involved in business world, who transmit and receive documents by means of electric mail via the internet has sharply been increasing. Electronic mail is a communication system for transmitting and receiving messages byway of personal computers and workstations, which is able to avoid the above problems involved with facsimile machines.

Under such circumstances, information transmitting apparatus which are capable of performing facsimile communications using e-mail in addition to usual facsimile communications, have been proposed recently (see Japanese Patent Application Laid-Open Hei 8 No.242326, Japanese Patent Application Laid-Open Hei 9 No.247334, for example).

Of recently developed information transmitting apparatus, there are some which display current job status. In such an apparatus, the current job status is displayed so that the user is able to monitor the operation status of the information transmitting apparatus, from the content of the display list showing the task in progress and the contents of the tasks not in progress but reserved.

Users who use the information transmitting apparatus will have the desire to feel sure that their reservation of document transmission has been correctly made and grasp the reservation status of the designated data transmission path when they designate the transmission.

With an information transmitting apparatus as above which is capable of displaying the current job status, the user is able to check the image frame representing the job status and grasp whether the user's reservation of document transmission is surely made, the reservation status (the state of congestion) of the designated data transmission path, and the like.

However, investigation has not been made in detail into a job status display system that can handle a multiple number of data transmission paths. Actually, in the conventional information transmitting apparatus, regardless of the data transmission path designated by the user being of usual facsimile or e-mail facsimile, the jobs of usual facsimile communications and the jobs of e-mail facsimile communications were displayed in order of the times at which they were designated on the same reservation list as a transmission/reception status display frame.

Therefore, this configuration was inconvenient for the users to check the reservation status. Particularly, in an information transmitting apparatus which establishes an independent information transmitting path for each of usual and e-mail facsimile communications, when an e-mail facsimile communication job is designated after a usual facsimile communication job has been designated, the e-mail facsimile job is displayed after the usual facsimile job though the former is transmitted far faster than the latter, thus leading the user to misunderstand the transmission order of jobs.

Further, since the conventional configuration required the user to take time to select and view the display frame of the job status, a user unfamiliar to the information transmitting apparatus could not check the reservation status of his/her own transmission job, and also in the worst case, they could not even confirm whether the reservation of their own designated job had been correctly made.

SUMMARY OF THE INVENTION

The information transmitting apparatus of the present invention has been devised in view of what is discussed above and it is therefore an object of the present invention to provide an information transmitting apparatus which is capable of information transmission via multiple data transmission paths and allows the user to readily and correctly check the transmission reservation status of the data transmission paths and confirm his/her own transmission reservation.

In order to achieve the above object, the present invention is configured as follows:

In accordance with the first aspect of the present invention, an information transmitting apparatus includes:

an information input means for inputting information;

a first information transmitting means for transmitting information via the first data transmission path;

a second information transmitting means for transmitting information via the second data transmission path;

a destination designating means for designating the destination of information;

a transmission control means for selecting one of the first and second information transmitting means and sending the information input through the information input means to the destination designated by the destination designating means;

a job status management means for managing the job statuses of transmitting information of the first and second information transmitting means;

a display means for displaying the job status of transmission of each of the information transmitting means managed by the job status management means; and a display control means for determining, based on the destination designated by the destination designating means, which job status of transmission of the first or second information transmitting means should be displayed on the display means.

In accordance with the second aspect of the present invention, the information transmitting apparatus having the above first feature is characterized in that the display control means, when one of the first and second data transmission paths is selected by the destination designating means, displays the transmission job status for the information transmitting means used for the selected data transmission path.

In accordance with the third aspect of the present invention, the information transmitting apparatus having the above first feature is characterized in that the destination designating means has a memory for storing a previously input list of destination information and determines a destination by its being selected from the destination list in the memory, and the display control means, when one of the destination information is selected from the list of destination information previously stored in the memory, selects either the first or second data transmission path based on the selected destination information and displays the transmission job status of the information transmitting means using the selected data transmission path.

In accordance with the fourth aspect of the present invention, the information transmitting apparatus having the above first feature is characterized in that the display control means is configured so that, in order to display the transmission job status, either the first or second information transmitting means can be selected and registered to have the priority over the other.

In accordance with the fifth aspect of the present invention, the information transmitting apparatus having the above first feature is characterized in that the display control means is configured so that the transmission job status of either one of the information transmission means which is determined to have a heavier load is displayed.

In accordance with the sixth aspect of the present invention, the information transmitting apparatus having any one of the above first through fifth features is characterized in that the display means, whilst displaying the control frame, displays the transmission job status on the lower layer of the control frame so that the summary of the frame for displaying the transmission job status is displayed appearing from behind the control frame.

BRIEF DESCRIPTION OF THE DRAWINGS

FIG. 8 is an illustrative view for illustrating the destination index table stored in the memory of the controller; and FIG. 9 is a flowchart showing the processing sequence of a document transmitting job in an information transmitting apparatus in accordance with one embodiment of the present invention.

DESCRIPTION OF THE PREFERRED EMBODIMENTS

One embodiment of an information transmitting apparatus according to the present invention will hereinafter be described with reference to the accompanying drawings.

Figure 1:
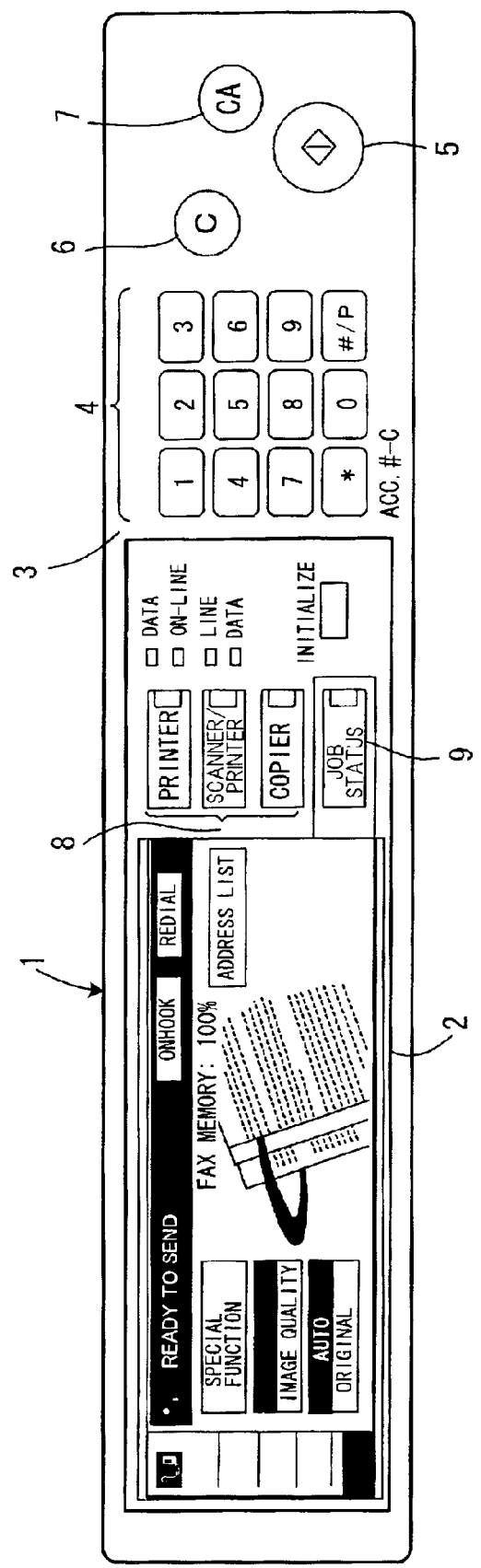
FIG. 1 is a plan view showing the control panel of an information transmitting apparatus in accordance with one embodiment of the present invention.

FIG. 1 is a plan view showing the control panel of an information transmitting apparatus in accordance with the embodiment of the present invention.

The information transmitting apparatus of the embodiment of the present invention is a multifunctional digital machine which has copier, printer and facsimile functions and the e-mail facsimile function of exchanging information via e-mail and hence is connected to the internet as well as to usual telephone lines.

A control panel portion 1 of this information transmitting apparatus has a display portion 2 capable of displaying a variety of information such as images, as well as numerals, symbols, etc., and control portion 3 allowing instructions associated with the setup conditions and task operations of the information transmitting apparatus to be input.

The above display portion 2 can employ a display device of a dot matrix type, for example. In the present embodiment, display portion 2 is comprised of a liquid crystal display panel with a transparent touch panel laid over the screen. In this way, by providing an input device made up of a transparent touch panel over the screen of the display portion 2, it becomes possible for the operator to perform input by touching the touch panel at the correct spot in accordance with the display on the screen even when the entry to the information transmitting apparatus is complicated. Accordingly, this configuration provides a user-friendly interface allowing easy input. Further, it is no longer necessary to provide intricate keys on control portion 3; it is possible to simplify the configuration of control portion 3 to a necessary minimum or not use control portion 3 at all in some information transmitting apparatus configurations.

The above control portion 3 is selected as appropriate depending on the configuration of the information transmitting apparatus and should not be particularly limited. For the information transmitting apparatus of a multifunctional type as in this embodiment, the control portion 3 is arranged substantially to the right side of control panel portion 1 and includes, as shown in FIG. 1, ten keys 4 for entry of the number of image formings, the number of sets, etc., a start key 5 for activating the operation of image forming, clear key 6 for clearing input information, a clear all key (CA key) 7 for clearing all the set conditions, and the like.

In this embodiment, as shown in FIG. 1, arranged in the approximate center of control panel portion 1 are function selection keys 8 for selection of copier, printer, e-mail facsimile/usual facsimile(scanner/fax key) and other functions, a job status key 9 for selectively displaying the current job status of image formation, and the like.

Arranged on approximately the left side of control panel 1 is the aforementioned display portion 2. This display portion 2 displays various information concerning the input conditions of a task operation on the information transmitting apparatus or various information (such as status display frame) for providing guidance of the operational status and job reservation states in this information transmitting apparatus.

Figure 2:
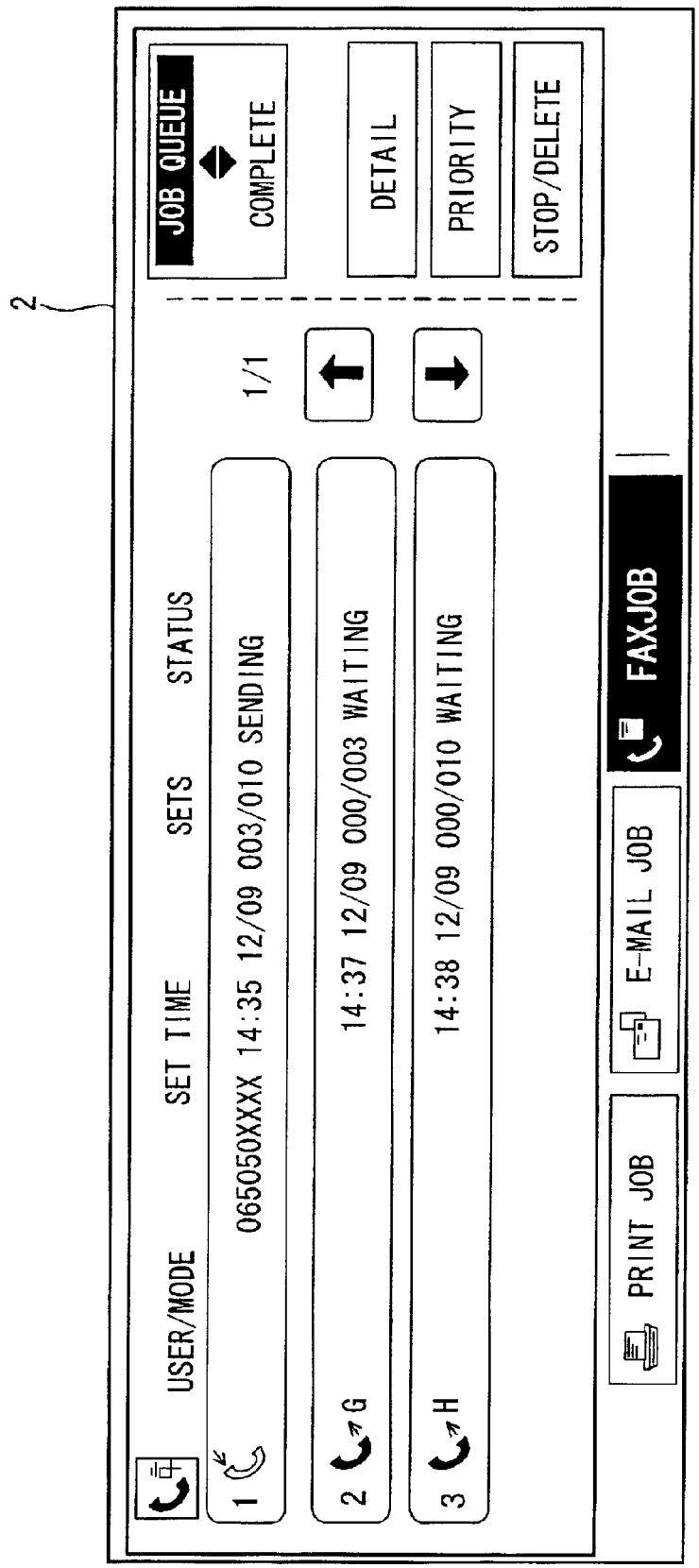
FIG. 2 is an illustrative view showing the display portion in which a variety of information (status display frame, etc.) is displayed in order to provide guidance of the operational status and job reservation states in the facsimile mode.
Figure 3:
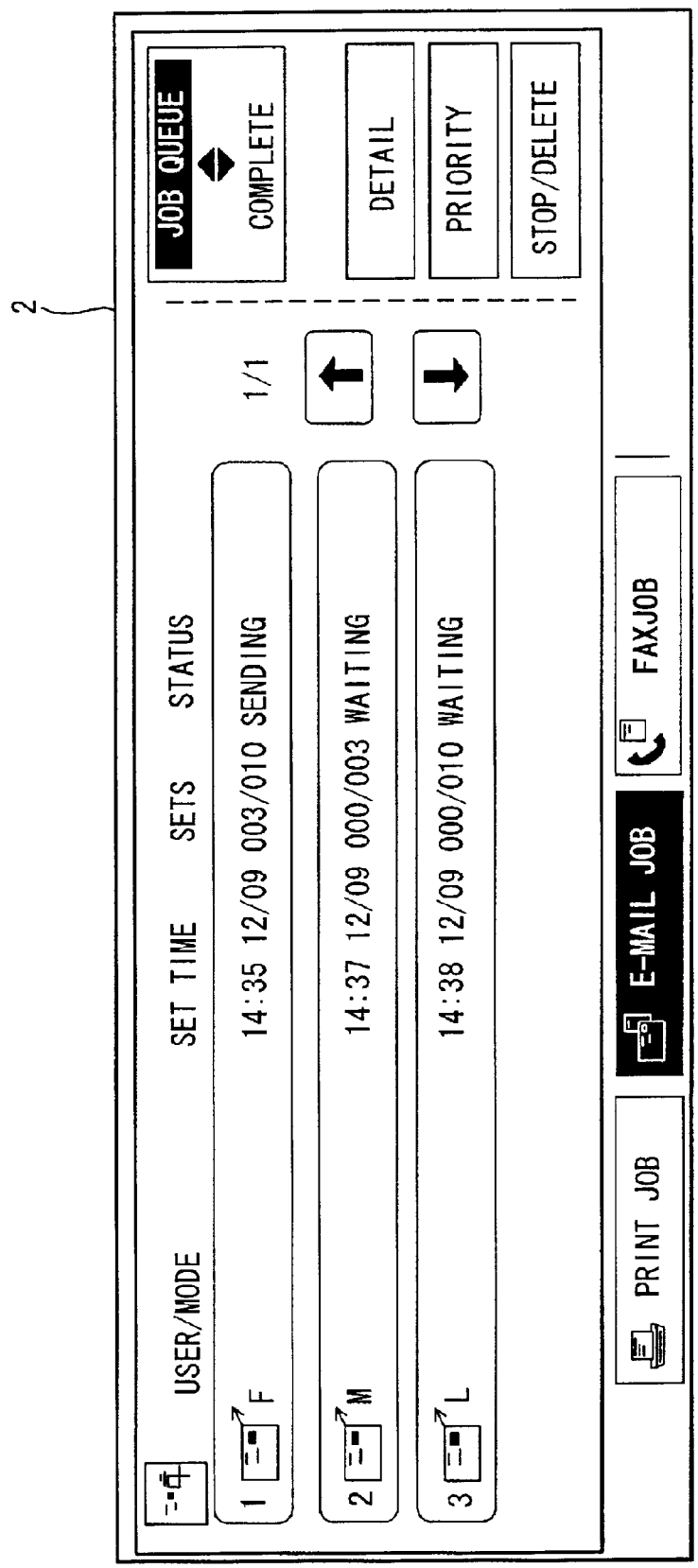
FIG. 3 is an illustrative view showing the display portion in which a variety of information(status display frame, etc.) is displayed in order to provide guidance of the operational status and job reservation states in the e-mail mode.

Referring to FIGS. 2 and 3, the information displayed on display portion 2 will be described. FIGS. 2 and 3 are illustrative views showing display portion 2 in which a variety of information (status display frame, etc.) is displayed in order to give guidance of the operational status and job reservation states in the facsimile mode and in the e-mail mode, respectively.

When the facsimile mode is selected, it is understood from the example shown in FIG. 2 that a facsimile transmission job '1' displayed at the top is currently in progress with the third document of ten having been sent while facsimile transmission jobs '2' and '3' displayed at the middle and bottom are now waiting to be processed.

Similarly, when the e-mail mode is selected, it is understood from the example shown in FIG. 3 that an e-mail transmission job '1' displayed at the top is currently in progress with the third document of ten having been sent while e-mail transmission jobs '2' and '3' displayed at the middle and bottom are now waiting to be processed.

The display frame displayed on display portion 2 of the control panel shown in FIG. 1 is the display view shown when the scanner/fax function key is selected. In this display frame, when the key for address list is operated by touching its area on the touch panel, the display view changes into a menu representation of destinations as shown in FIG. 4.

Figure 4:
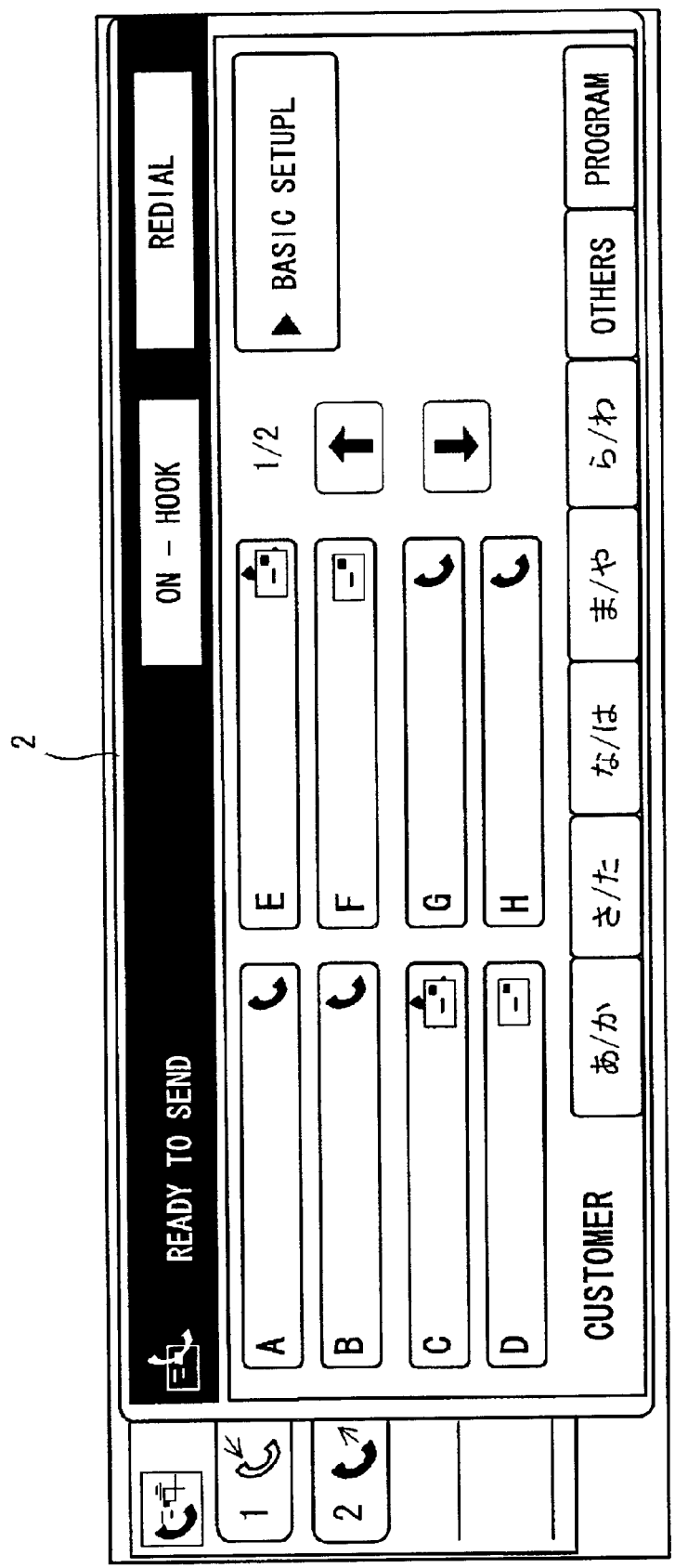
FIG. 4 is an illustrative view for illustrating the display frame showing a destination address list in the display portion.

In the display frame shown in FIG. 4, both the addresses to which usual facsimile transmission is permitted and the addresses to which e-mail facsimile transmission is permitted are displayed in combination. Each key has an addressee name (A, B, C, D . . . , H) registered in the memory and an icon representing the data transmission path to the registered addressee, either the usual facsimile transmission via the telephone lines (e.g., A, B, G and H), or the e-mail facsimile transmission via the internet (e.g., D and F), or both (e.g., D and E).

Each of these keys is a fingertip or one-touch dialing key, which is operated so as to select the addressee and designate data transmission. In the embodiment shown in FIG. 4, as the lower layer of the display frame of the menu representation of the destination addressees, a status frame that represents the job states of facsimile transmission only is displayed. In this way, only displaying the status frame of facsimile transmission jobs makes it possible for the user who has selected the information transmission mode to know the status of jobs taking time for (loading) transmission beforehand.

Figure 5:
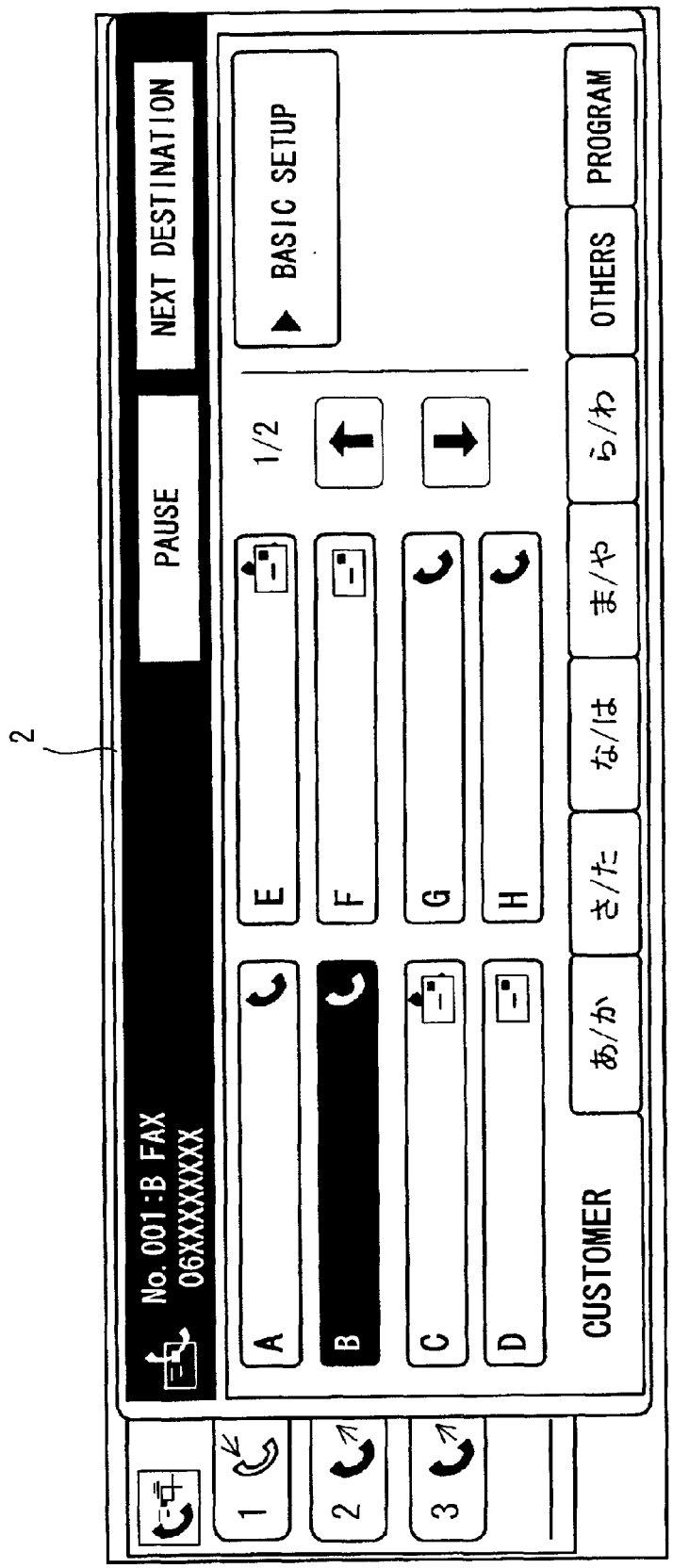
FIG. 5 is an illustrative view for illustrating the display frame when the key 'B' in the display portion is operated.

In the state where the destinations are displayed in a menu form as shown in FIG. 4, if the user selects the key 'B' for facsimile transmission using the usual telephone lines, the display view changes into that shown in FIG. 5. At that time, the key 'B' in display portion 2 becomes highlighted while icons representing the job status of facsimile transmission is displayed so as to look as if behind the control frame in the area for illustrating the status summary (in the icon display portion). In this way, as the key 'B' is operated, an additional icon appears on the status frame so as to provide guidance that the job just designated by the user has been accepted as the third facsimile transmission job reservation.

At this event, the icon may preferably flash for some seconds and then become displayed steadily or normally instead of the icon merely being added on the status frame. Thus, this display scheme makes it possible for the operator to know at a glance that his/her transmission designation is of usual facsimile transmission, the reservation of his/her own transmission designation has been correctly made and the job status of his/her own transmission designation.

Figure 6:
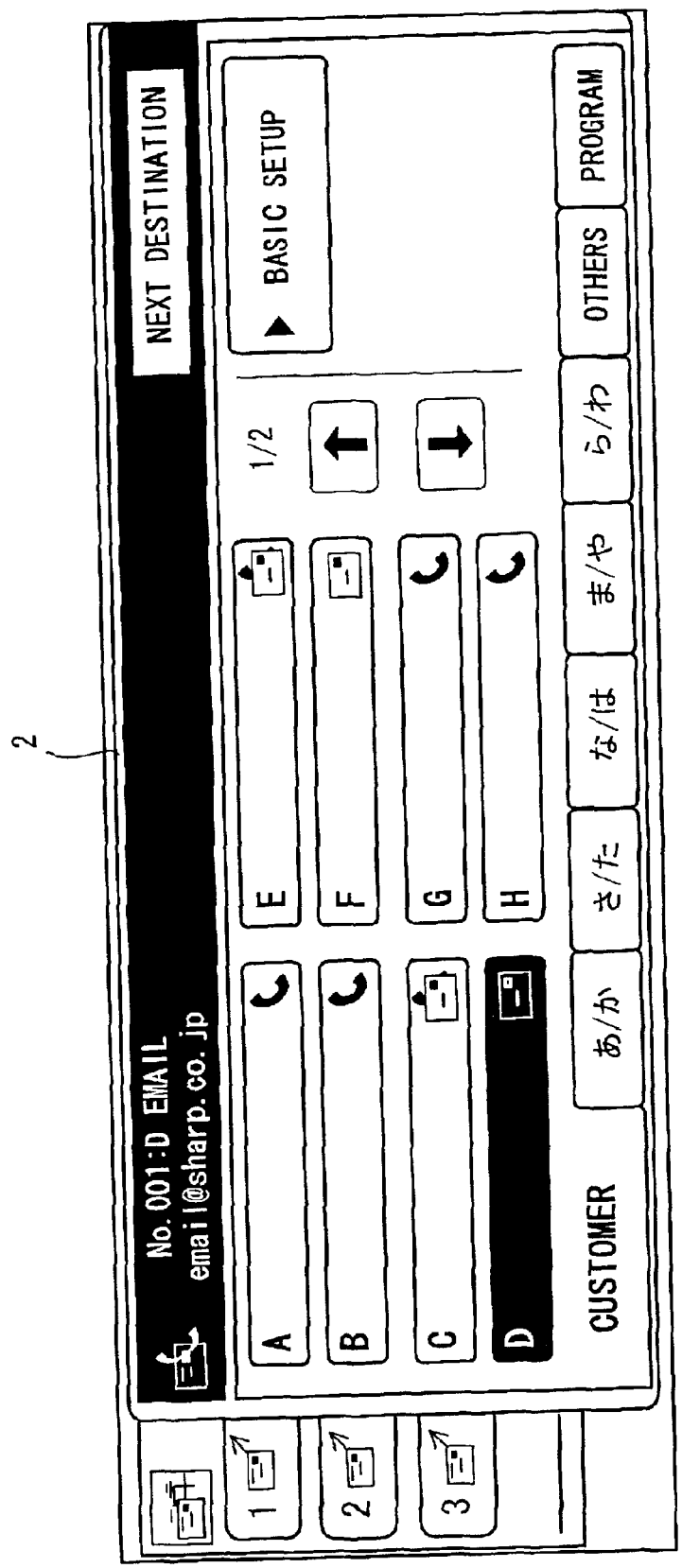
FIG. 6 is an illustrative view for illustrating the display frame when the key 'D' in the display portion is operated.

In the state where the destination addressees are displayed in a menu form as shown in FIG. 4, if the user selects the key 'D' for e-mail transmission, the display view changes into that shown in FIG. 6. At that time, the key 'D' in display portion 2 becomes highlighted while the status frame showing the job status of e-mail transmission only is laid under the control frame so that icons illustrating the status appear from behind the control frame. In this way, as the key 'D' is operated, an additional icon appears on the status frame so as to provide guidance that the job just designated by the user has been accepted as the third e-mail transmission job reservation.

At this event, the icon may preferably flash for some seconds and then become displayed steadily or normally instead of the icon merely being added on the status frame. Thus, this display scheme makes it possible for the operator to know at a glance that his/her transmission designation is of a usual e-mail transmission, the reservation of his/her own transmission designation has been correctly made and the job status of his/her own transmission designation.

Figure 7:
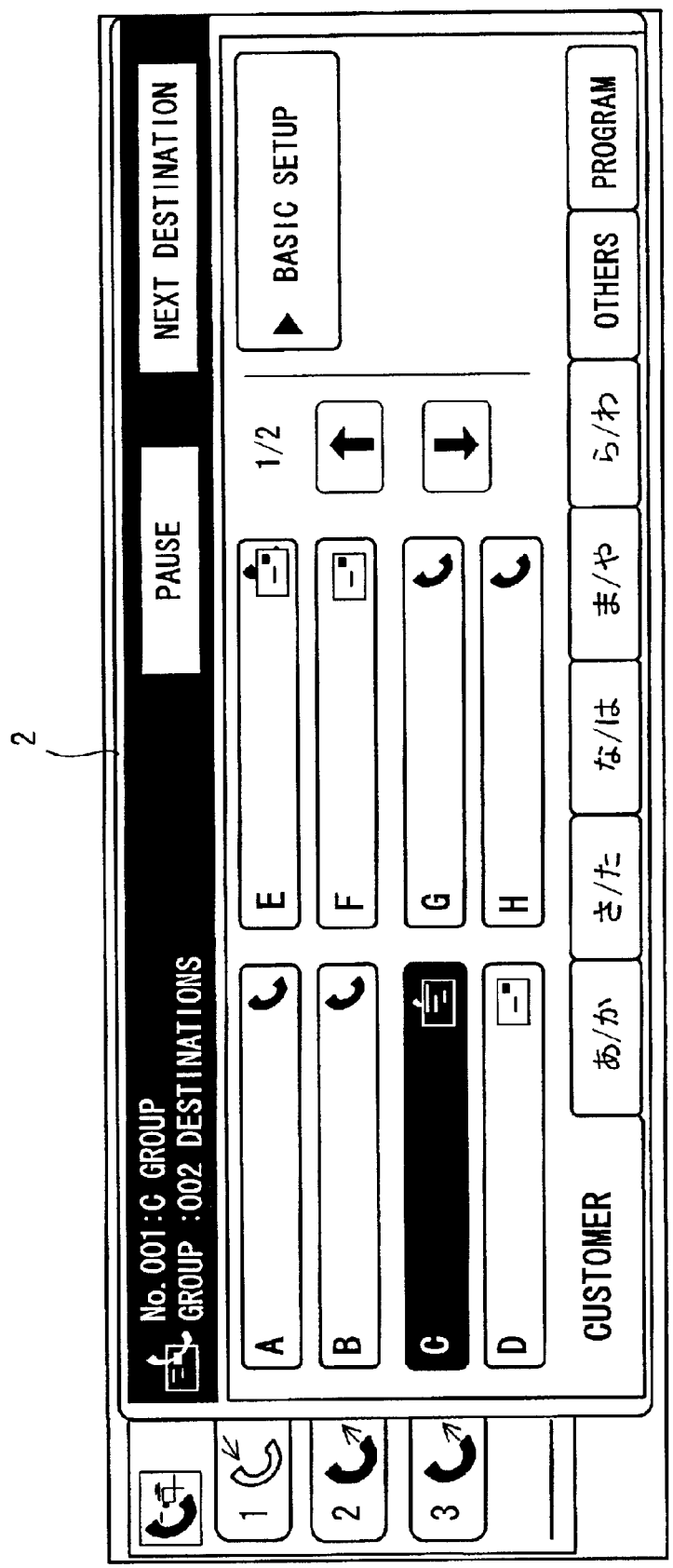
FIG. 7 is an illustrative view for illustrating the display frame when the key 'C' in the display portion is operated.

Further, in the state where the destination addressees are displayed in a menu form as shown in FIG. 4, if the user selects the key 'C' for both e-mail transmission and facsimile transmission, the display view changes into that shown in FIG. 7. At that time, the key 'C' in display portion 2 becomes highlighted while an additional icon appears on the status frame having been already displayed representing the job status of facsimile transmission only so as to provide guidance that the job just designated by the user has been accepted as the third facsimile transmission job reservation.

At this event, the icon may preferably flash for some seconds and then become displayed steadily or normally instead of the icon merely being additionally displayed on the status frame. Thus, this display scheme makes it possible for the operator to know at a glance that his/her transmission designation is of a usual facsimile transmission, the reservation of his/her own transmission designation has been made and the job status of his/her own transmission designation.

In the embodiment described above, when a fingertip dialing key for destinations of both facsimile transmission and e-mail transmission is operated, the processing state of facsimile transmission is adapted to be displayed as the processing status of the job. However, it is possible to change the processing status display of the job depending upon user settings, the status of transmission processing time or the like. For example, it is possible to configure a system so that the user may designate beforehand which transmission processing status should be displayed for guidance. It is also possible to configure a system which automatically selects and displays the guidance for the transmission processing status of the transmitting means taking a longer time for its transmission process.

In general, transmission via e-mail can be effected in quickly because it only needs to make a request of mail transmission to the-mail server. For facsimile transmission, it is necessary to establish a communications protocol first between the source and destination, and then start the transmission. Therefore, facsimile transmission needs a longer time for processing.

In the above embodiment, for both the facsimile transmission and e-mail transmission, flashing icons are used to reveal that an additional reservation of transmission designation has been made. Other than this displaying method, the added icons may be displayed with black and white reversed or may be displayed with a different color. Alternatively, it is also possible and effective if the additional icon is displayed at the predetermined position on the status frame whilst it is being turned.

The information transmitting apparatus according to this embodiment has in its main part a controller (made up of, for example, a microcomputer and peripheral modules) for governing the entire information transmitting apparatus. The controller has a memory for storing the destination index table.

Referring next to FIG. 8, the destination index table stored in the memory of the controller will be described. FIG. 8 is an illustrative view showing a destination index table stored in the memory of the controller.

In the destination index table stored in the memory as shown in FIG. 8, each fingertip key is allotted with a management number starting from '01' and a destination addressee name registered using by a limited number of characters. For each fingertip key, this registered name is displayed. In destination index table, for each addressee, a multiple number of destinations including destination phone numbers and e-mail addresses, can be registered.

Referring next to the flowchart of FIG. 9, the processing sequence of a document transmission job with the information transmitting apparatus according to this embodiment will be described.

When the operator touches any of the fingertip keys on the display frame shown in FIG. 4 (S1), the management number of a destination addressee of the designated key is detected by the touch panel control coordinates(S2).

Subsequently, it is judged from the aforementioned index table whether the destination information of the selected addressee is of only a telephone number, i.e., usual facsimile transmission(S3).

When the destination information of the selected addressee has been determined to be of only telephone number or usual facsimile transmission, the current job status of facsimile transmission is displayed(S4). As stated above, this job status of facsimile transmission is displayed so that the display area of the icons of the job status frame of facsimile transmission is displayed appearing to be behind the control frame.

On the other hand, when the destination information of the selected addressee has been determined not to be of only a telephone number or usual facsimile transmission, it is judged whether the destination information is of only an e-mail addresse, i.e., e-mail transmission(S5).

When the destination information of the selected addressee has been determined to be of only an e-mail addresses or e-mail transmission, the current job status of e-mail transmission is displayed(S6). As stated above, this job status of e-mail transmission is displayed so that the display area of the icons of the job status frame of e-mail transmission is displayed appearing to be behind the control frame.

When the destination information of the selected addressee has been determined neither to be of only e-mail transmission nor of only facsimile transmission, that is, determined to involve both e-mail transmission and facsimile transmission, the system automatically determines the status of which job of transmission, either of e-mail transmission or facsimile transmission should be displayed as guidance and displays the determined one(S7). As stated above, this determined job status is displayed so that only the display area of the icons of the job status frame is displayed appearing to be behind the control frame.

After the job status display has been displayed at each step(S4, S6 or S7), it is checked whether the documents to be sent are set on the automatic document feeder in the scanner portion(S8). If no documents to be sent are in place, a request that documents to be sent to be set is made(S12) and waits for documents to be sent to be set.

Next, when it is confirmed that documents have been set on the automatic document feeder in the scanner portion, the images of the documents to be sent are scanned(S9), the scanned images are handled as transmission image information in the memory(S10), and are processed for facsimile transmission or for e-mail transmission in accordance with the direction(S11). As scanning of the documents is completed and the transmission job to the designated destination starts, an icon representing that the transmission job has been accepted is added to the display area of the icons of the job status frame peering behind the control frame.

In the above description, the case in which the system has the fingertip dialing function and the destination addressee is designated using the fingertip dialing function was described. When a telephone number or address is directly input, the status of the transmission path may and should be displayed in a similar manner as above at the point when the input is determined to be either phone number or e-mail address.

In this way, since the status of transmission is displayed for the operator when the transmission path to the destination addressee has been determined, it is possible to improve the usability of the information transmitting apparatus.

In the above embodiment, for displaying the transmission path status, icons illustrating job contents are displayed at the side of the control frame without the control frame disappearing so as to provide visual guidance to the operator. Therefore, it is possible for the user to readily understand the status and the like of the transmission jobs. The displaying method should not be limited to the above. For example, the entire status frame for displaying the status may be displayed over (in the upper layer of) the operation control frame for a predetermined time or a predetermined number of times.

The information transmitting apparatus of the present invention is thus configured and has the effects as follows.

In the information transmitting apparatus of the present invention, the information transmission status of jobs of the first information transmitting means and that of the second information transmitting means are controlled separately, and one of them is determined to be displayed on the display means based on the destination designated by the destination designating means, and the determined transmission status of jobs is displayed.

Therefore, when the transmission is designated, the transmission job status of the data transmission path to be used for the currently designated transmission is displayed alone, so even a user who is unfamiliar to the operation of the information transmitting apparatus can check the type of the data transmission path of his/her own selection, the reservation of the designated transmission job and the order of processing(reservation status), at the same time.

As a result, it is possible to improve the usability of the information transmitting apparatus including a multiple number of information transmitting means and realize enhanced user satisfaction.

Since in the information transmitting apparatus of the present invention, when the user designates the destination using the destination designating means (for example, when the user inputs the address number, phone number, or the like), one of the first and second data transmission paths is selected, the transmission job status of the information transmission means using the selected data transmission path is displayed on the display means.

Therefore, assuming, for example, that the first data transmission path is of facsimile transmission and the second data transmission path is of e-mail transmission, if the user knows both the facsimile number and e-mail address of a destination addressee, the user can change the transmission route at a point halfway. Actually, when the user selects facsimile transmission first and is going to input the phone number, he/she may find that a number of reservations for facsimile transmission jobs have been made from the display frame for facsimile transmission displayed on the display means. In such a case, the user is able to change the transmission route and input the e-mail address to thereby select e-mail transmission.

As a result, it is possible to further improve the usability of the information transmitting apparatus including a multiple number of information transmitting means and realize a more enhanced user satisfaction.

In the information transmitting apparatus of the present invention, one destination is selected first from the previously input list of destinations by the destination designating means and then it is determined which data transmission path, either the first or second one, will be used based on the registered information of the selected destination, and the transmission job status of the selected path is displayed on the display means.

Therefore, assuming, for example, that the first data transmission path is of facsimile transmission and the second data transmission path is of e-mail transmission, if the user has registered both the facsimile number and e-mail address of a destination addressee, the user can change the transmission route at a point halfway. Actually, when the user selects facsimile transmission first and is going to input the phone number, he/she may find that a number of reservations for facsimile transmission jobs have been made from the display frame for facsimile transmission displayed on the display means. In such a case, the user is able to change the transmission route and input the e-mail address to thereby select e-mail transmission.

As a result, it is possible to further improve the usability of the information transmitting apparatus including a multiple number of information transmitting means and realize a more enhanced user satisfaction.

In the information transmitting apparatus of the present invention, when multiple destinations of an identical addressee are designated for one piece of information to be sent, it is possible for the user to arbitrarily select one of the information transmitting means so that its transmission job status can be displayed taking the priority over the others.

Therefore, it is possible to display the job status of the desired information transmitting means on the display means in conformity with the user needs and usage environment.

As a result, it is possible to further improve the usability of the information transmitting apparatus including a multiple number of information transmitting means and the user is able to readily understand the progressing status of the job designated to be transmitted, thus realizing a more enhanced user satisfaction.

In the information transmitting apparatus of the present invention, when multiple destinations of an identical addressee are designated for one piece of information to be sent, the job status of the information transmission means which has been determined to have a heavier load (or taking a longer time) is displayed.

Therefore, it is possible to provide guidance that the transmission job designated by the user will be reliably performed.

As a result, it is possible to further improve the usability of the information transmitting apparatus including a multiple number of information transmitting means and the user is able to readily understand the progressing status of the job designated to be transmitted, thus realizing a more enhanced user satisfaction.

In the information transmitting apparatus of the present invention, when the display means displays the transmission job status, the display means whilst it is displaying the control frame, displays the transmission job status on a lower layer of the control frame so that the summary of the frame for displaying the transmission job status is displayed appearing to be behind the control frame.

Therefore, the user is able to know the summary of the display frame for representing the transmission job status whilst performing control operations in the control frame. Since the information the user wants to know from this frame is whether the reservation of the user's transmission designation has been correctly made, the reservation status, and the like, display of the summary is adequate. Thus, it is possible to further improve the usability compared to the configuration where the frame of the transmission job status is fully displayed instead of the control frame.

What is claimed is:

1. An information transmitting apparatus comprising:
   an information input means for inputting information;
   a first information transmitting means for transmitting information via the first data transmission path;
   a second information transmitting means for transmitting information via the second data transmission path;
   a destination designating means for designating the destination of information;
   a transmission control means for selecting one of the first and second information transmitting means and sending the information input through the information input means to the destination designated by the destination designating means;
   a job status management means for managing the job statuses of transmitting information of the first and second information transmitting means;
   a display means for displaying the job status of transmission of each of the information transmitting means managed by the job status management means; and
   a display control means for determining, based on the destination designated by the destination designating means, which job status of transmission of the first or second information transmitting means should be displayed on the display means.

2. The information transmitting apparatus according to claim 1, wherein the display control means, when one of the first and second data transmission paths is selected by the destination designating means, displays the transmission job status for the information transmitting means used for the selected data transmission path.

3. The information transmitting apparatus according to claim 1, wherein the destination designating means has a memory for storing a previously input list of destination information and determines a destination by its being selected from the destination list in the memory, and the display control means, when one of the destination information is selected from the list of destination information previously stored in the memory, selects either the first or second data transmission path based on the selected destination information and displays the transmission job status of the information transmitting means using the selected data transmission path.

4. The information transmitting apparatus according to claim 1, wherein the display control means is configured so that, in order to display the transmission job status, either the first or second information transmitting means can be selected and registered to have the priority over the other.

5. The information transmitting apparatus according to claim 1, wherein the display control means is configured so that the transmission job status of either one of the information transmission means which is determined to have a heavier load is displayed.

6. The information transmitting apparatus according to any one of claim 1, wherein the display means, whilst displaying the control frame, displays the transmission job status on the lower layer of the control frame so that the summary of the frame for displaying the transmission job status is displayed appearing from behind the control frame.

7. The information transmitting apparatus according to any one of claim 2, wherein the display means, whilst displaying the control frame, displays the transmission job status on the lower layer of the control frame so that the summary of the frame for displaying the transmission job status is displayed appearing from behind the control frame.

8. The information transmitting apparatus according to any one of claim 3, wherein the display means, whilst displaying the control frame, displays the transmission job status on the lower layer of the control frame so that the summary of the frame for displaying the transmission job status is displayed appearing from behind the control frame.

9. The information transmitting apparatus according to any one of claim 4, wherein the display means, whilst displaying the control frame, displays the transmission job status on the lower layer of the control frame so that the summary of the frame for displaying the transmission job status is displayed appearing from behind the control frame.

10. The information transmitting apparatus according to any one of claim 5, wherein the display means, whilst displaying the control frame, displays the transmission job status on the lower layer of the control frame so that the summary of the frame for displaying the transmission job status is displayed appearing from behind the control frame.

* * * * *